ABSTRACT OF THE DISCLOSURE

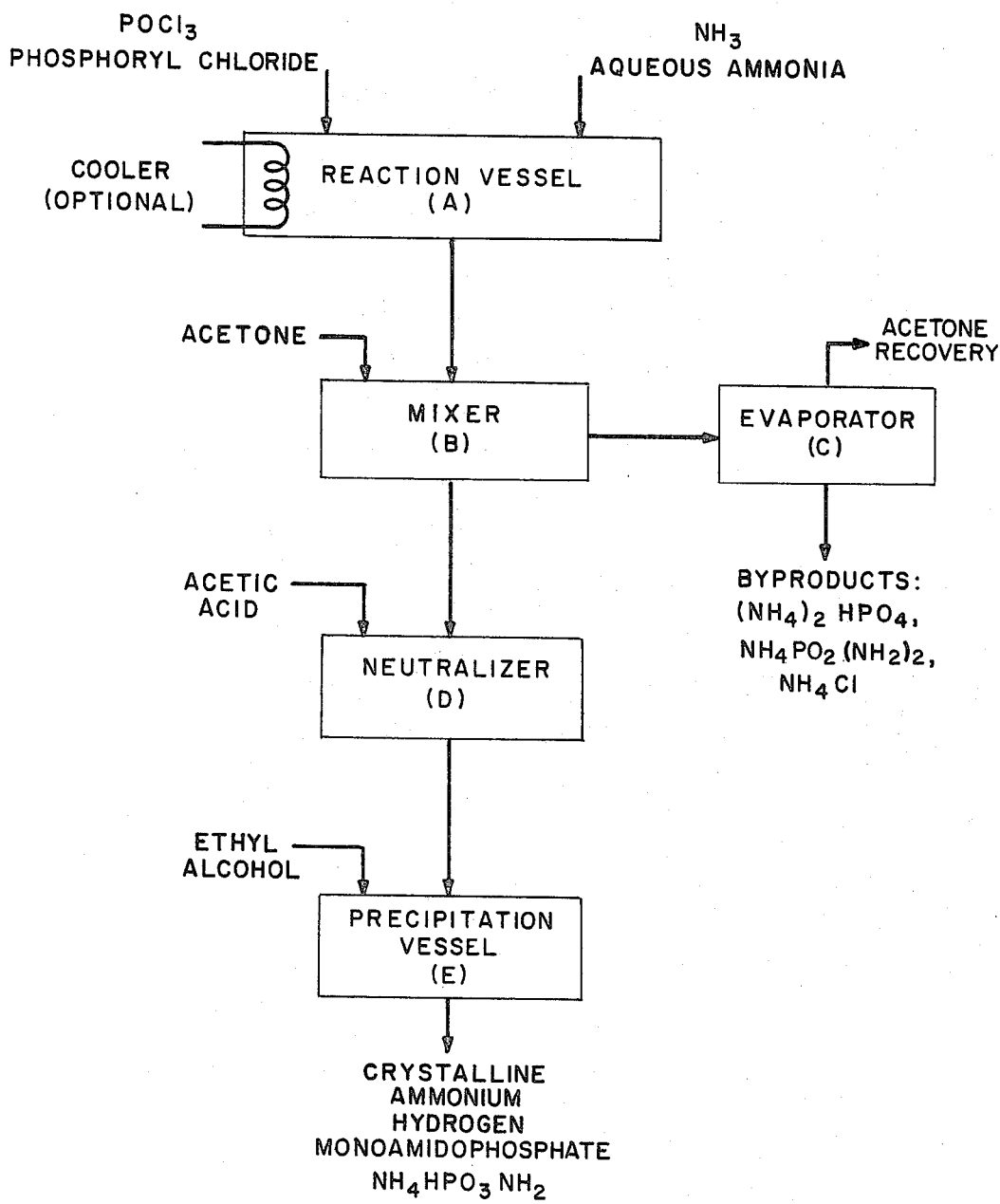
PREPARATION OF AMMONIUM HYDROGEN MONOAMIDOPHOSPHATE BY THE DIRECT REACTION OF PHOSPHORYL CHLORIDE AND AQUEOUS AMMONIA 3,598,549
AMMONIUM HYDROGEN MONO-
AMIDOPHOSPHATE
Richard C. Sheridan, Sheffield, Ala., assignor to
Tennessee Valley Authority
Filed Feb. 14, 1969, Ser. No. 799,271
Int. Cl. C01b 25/28
U.S. Cl. 23—357       11 Claims

Ammonium hydrogen monoamidophosphate is prepared by treating an aqueous solution of ammonia with phosphoryl chloride. The reaction solution is mixed with acetone, and the product is recovered from the aqueous layer by neutralizing with acetic acid and precipitating with ethyl alcohol.

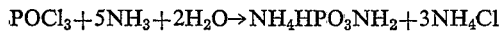

My invention relates to an improved process for the preparation of ammonium hydrogen monoamidophosphate ($NH_4HPO_3NH_2$), also known as ammonium phosphoramidate, and more particularly it relates to a direct method of reacting phosphoryl chloride with aqueous ammonia to form ammonium hydrogen monoamidophosphate, which can be essentially represented as follows, it being understood that certain byproducts formed in my process are not included in the general overall reaction.

$$POCl_3 + 5NH_3 + 2H_2O \rightarrow NH_4HPO_3NH_2 + 3NH_4Cl$$

Ammonium hydrogen monoamidophosphate is an excellent high-analysis fertilizer having good physical properties which contains 86 percent plant nutrients [($N+P_2O_5$), i.e. 24–62–0]. Ammonium hydrogen monoamidophosphate is useful also as an intermediate in the preparation of amidophosphoric acid and its derivatives which are of utility as corrosion inhibitors and also as intermediates in the preparation of sequestering agents and alkaline builders for detergent compositions.

A method of preparing ammonium hydrogen monoamidophosphate was reported by Stokes [H. N. Stokes, Am. Chem. J. 15 198 (1893)]. Stokes teaches a process that requires five separate reactions and the use of organic intermediates to obtain ammonium hydrogen monoamidophosphate as follows:

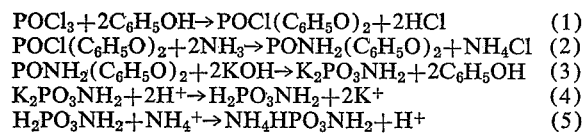

$$POCl_3 + 2C_6H_5OH \rightarrow POCl(C_6H_5O)_2 + 2HCl \quad (1)$$
$$POCl(C_6H_5O)_2 + 2NH_3 \rightarrow PONH_2(C_6H_5O)_2 + NH_4Cl \quad (2)$$
$$PONH_2(C_6H_5O)_2 + 2KOH \rightarrow K_2PO_3NH_2 + 2C_6H_5OH \quad (3)$$
$$K_2PO_3NH_2 + 2H^+ \rightarrow H_2PO_3NH_2 + 2K^+ \quad (4)$$
$$H_2PO_3NH_2 + NH_4^+ \rightarrow NH_4HPO_3NH_2 + H^+ \quad (5)$$

The Stokes synthesis, supra, is tedious and time-consuming and the yield is low, but it is still the best method of making the inorganic derivatives of amidophosphoric acid, according to volume 1 of Phosphorus and Its Compounds, by John R. Van Wazer, published in 1958 by Interscience Publishers, Inc., New York, N.Y. (page 831).

I have discovered a simplified method of preparing ammonium hydrogen monoamidophosphate from phosphoryl chloride and aqueous ammonia in yields comparable to and, in most instances, better than those found in the prior art.

Furthermore, several new and advantageous features over the conventional process for the production of ammonium hydrogen monoamidophosphate shown in the prior art are realized by the present invention.

Among these advantageous features are: a process which (1) is convenient for preparing and handling ammonium hydrogen monoamidophosphate; (2) is relatively simple and convenient for permitting the production of a composition of matter which is not now available on a commercial basis, but which is highly suitable for use as a high-analysis fertilizer, as a component in mixed fertilizers, as an intermediate in the preparation of amidophosphoric acid and its derivatives and therefore as an intermediate in the preparation of corrosion inhibitors, sequestering agents and alkaline builders to detergent compositions; (3) utilizes commercially available raw materials; (4) produces as byproducts ammonium diamidophosphate, diammonium orthophosphate, and ammonium chloride, which are all valuable fertilizer compounds; (5) obviates the requirement for the use of organic intermediates; and (6) in another embodiment thereof provides a simple and convenient method for preparing free amidophosphoric acid and its salts by use of the capital product from my process.

It is therefore an object of the present invention to produce economically, simply, and directly ammonium hydrogen monoamidophosphate, either as a concentrated aqueous solution or as a dry solid salt pure enough for either laboratory or commercial use.

Another object of the present invention is the economical, simple, and direct production of ammonium hydrogen monoamidophosphate pure enough for both laboratory studies and commercial use, and which process may utilize as raw material commercially avilable, relatively inexpensive and well-known chemicals.

In carrying out the objects of my invention in one form thereof, I mix phosphoryl chloride to a cooled aqueous solution of ammonia. Subsequently, after a brief residence time, I mix acetone with the reacted solution, allow it to separate into two layers, neutralize the separated aqueous bottom layer with acetic acid, and cool same to induce crystallization, whereupon I separate as product the resulting crystallized ammonium hydrogen monoamidophosphate. I have found that I can increase the yield of my product by diluting the remaining filtrate with about an equal volume of ethanol to shower down additional crystals of ammonium hydrogen monoamidophosphate.

My invention, together with further objects and advantages thereof, will be better understood from a consideration of the following description taken in connection with the accompanying drawing in which:

The figure is a flowsheet in box form generally illustrating the principles of my novel process which results in a product having the properties mentioned above.

Referring now more specifically to the figure, section A represents any vessel suitable for containing the reaction mixture during the reaction period. The reaction solution from the reaction vessel A is fed to a suitable mixing vessel B and mixed with acetone. The top liquid layer in the mixing vessel B is fed to an evaporator C where the acetone is recovered and the byproduct solids ammonium diamidophosphate, diammonium orthophosphate, and ammonium chloride are obtained. The bottom aqueous liquid layer from mixing vessel B is fed to any suitable neutralization vessel D and neutralized with acetic acid. Precipitation vessel E is any suitable container for the precipitation of product ammonium hydrogen monoamidophosphate by the addition of ethyl alcohol.

As mentioned supra, my process also offers a simple method of preparing free amidophosphoric acid and its salts by use of the ammonium hydrogen monoamidophosphate produced as just described. In this embodiment, I find that I can prepare the free amidophosphoric acid and its salts by using the ammonium hydrogen monoamidophosphate produced according to my teachings as an intermediate according to the following procedure:
Monoamidophosphoric acid:

$$NH_4HPO_3NH_2 + HClO_4 = H_2PO_3NH_2 + NH_4ClO_4$$

Procedure:

$NH_4HPO_3NH_2$ (11.4 g. 0.1 mol) is dissolved in 150 ml. of water, cooled in an ice bath, and cautiously acidified with slightly more than the stoichiometric amount of dilute $HClO_4$ (17 percent). The acid solution is diluted with a liter of ethanol and allowed to stand in the ice bath for 30 minutes to induce crystallization. The product is collected, washed successively with alcohol and ether, and air dried. The yield is 7.5 g. or 77 percent.

*Analysis.*—Calcd. for $H_2PO_3NH_2$ (percent): N, 14.44; $NH_4$—N 0.00; P, 31.93. Found (percent): N, 14.4; $NH_4$—N, 1.0; P, 31.5.

Potassium hydrogen monoamidophosphate:

$$NH_4HPO_3NH_2 + 2KOH = K_2PO_3NH_2 + H_2O + NH_3$$

$$K_2PO_3NH_2 + CH_3CO_2 = KHPO_3NH_2 + CH_3CO_2K$$

Procedure:

$NH_4HPO_3NH_2$ (11.4 g., 0.1 mol) is dissolved in 20 ml. of 50 percent KOH solution and warmed to 50° to 60° C. to expel ammonia. The solution is cooled, neutralized with acetic acid, and treated with ethanol to precipitate the potassium salt which is filtered with suction, washed successively with alcohol and ether, and air dried. The yield is 8.1 g. or 60 percent.

*Analysis.*—Calcd. for $KHPO_3NH_2$ (percent): N, 10.37; P, 22.93. Found (percent): N, 10.4; P, 22.7.

In order that those skilled in the art may better understand how the present invention can be practiced and more fully and definitely understood, the following examples of the process I have used in the direct production of ammonium hydrogen monoamidophosphate are given by way of illustration and not by way of limitation.

EXAMPLE I

To a 1000 cc. flask containing 300 ml. of stirred, 10 percent ammonium hydroxide there was added 30.67 grams of phosphoryl chloride at about 0° C. over a period of about 5 minutes. After stirring about 15 minutes, the reaction mixture was mixed with one liter of acetone to give two liquid phases. The aqueous (bottom) layer was separated, neutralized with acetic acid, and diluted with an equal volume of ethyl alcohol to precipitate the product ammonium hydrogen monoamidophosphate. The ammonium hydrogen monoamidophosphate was homogeneous and well-crystallized with the established powder X-ray pattern and infrared spectrum and melted at 233–234° C. The product ammonium hydrogen monoamidophosphate contained 24.5 percent total nitrogen (theory, 24.56 percent), 12.4 percent ammonium nitrogen (theory, 12.28 percent), and 27.0 percent phosphorus (theory, 27.14 percent). The product ammonium hydrogen monoamidophosphate weighed 14.4 grams, representing a yield of 63 mole percent based on the phosphoryl chloride charge.

EXAMPLE II

In this series of tests, the procedure in Example I above was repeated. However, I utilized various quantities of reactants and temperatures to establish my operable, preferred, and most preferred limits. The data from these tests are as reported in Table I infra.

TABLE I

| Temperature, °C.: | Mole ratios of reactants | | | Ammonium hydrogen mono-amidophosphate yield, mole percent |
|---|---|---|---|---|
| | $N_3H_3/POCl_3$ | $H_2O/NH_3$ | $H_2O/POCl_3$ | |
| 0 | 7.6 | 0 | 0 | 0.0 |
| 0 | 7.6 | 2.3 | 17.8 | 52.0 |
| 0 | 7.6 | 4.2 | 42.8 | 55.9 |
| 0 | 7.6 | 9.7 | 73.4 | 63.3 |
| 0 | 7.6 | 13.3 | 101.0 | 58.9 |
| 0 | 4.6 | 9.9 | 45.6 | 59.5 |
| 0 | 6.1 | 9.7 | 58.6 | 52.1 |
| 0 | 9.2 | 9.6 | 88.1 | 26.4 |
| 0 | 7.6 | 9.7 | 73.4 | 63.3 |
| 25 | 7.6 | 9.7 | 73.4 | 48.7 |
| 56 | 7.6 | 9.7 | 73.4 | 40.0 |
| 90 | 7.6 | 9.7 | 73.4 | 11.0 |

As can be seen from the data in Table I supra, good yields of ammonium hydrogen monoamidophosphate are obtained with various ratios of the reactants phosphoryl chloride, water, and ammonia. These yields are comparable to and in many instances higher than those obtained by the complicated prior art procedure. It can also be seen that no ammonium hydrogen monoamidophosphate is formed in the absence of water because the phosphoryl chloride must undergo both ammonolysis and hydrolysis. From the above, I am now able to establish my operable and preferred ranges for mole ratios, reaction temperatures, retention time, volume of reactants, etc. For convenience, these are as summarized in Table II below.

TABLE II

| Parameter considered | Operable range | Preferred range | Most preferred range |
|---|---|---|---|
| $NH_3$:$POCl_3$ (mole ratio) | 5–20 | 6–10 | 7 |
| $H_2O$:$POCl_3$ (mole ratio) | 2–150 | 20–75 | 65–70 |
| Reaction temperature, °C | −77–+90 | 0–15 | ca. 0 |
| Retention time (based on charging 1 mole of $POCl_3$ to 7.5 moles $NH_3$) min | 10–60 | 20–30 | ca. 25 |
| Acetone: reacted solution (volume ratio) | 2–5:1 | 3–4:1 | 3.5:1 |

What I claim as new and desire to secure by Letters Patent of the United States is:

1. A process for producing ammonium hydrogen monoamidophosphate comprising the steps of:
   (1) reacting at about atmospheric pressure and in the temperature range between about −77° C. and about +90° C. phosphoryl chloride with aqueous ammonia, the mole ratio of ammonia to phosphoryl chloride being in the range from about 5 to about 20 and the mole ratio of water to phosphoryl chloride being in the range from about 2 to about 150;
   (2) subsequently mixing acetone with the resulting reacted solution;
   (3) allowing the reacted solution—acetone mixture to separate into two liquid phases, the upper phase comprising acetone and byproduct ammonium diamidophosphate, diammonium orthophosphate, and ammonium chloride, and the bottom phase comprising an aqueous solution of ammonium hydrogen monoamidophosphate and unreacted ammonia;
   (4) separating said bottom phase from said top phase and neutralizing said bottom phase with acetic acid and cooling the resulting neutralized solution to induce crystallization of ammonium hydrogen monoamidophosphate;
   (5) and thereafter collecting as product the resulting crystals of ammonium hydrogen monoamidophosphate.

2. The process of claim 1 wherein additional crystals of the product ammonium hydrogen monoamidophosphate are obtained by diluting the mother liquor comprising the neutralized and cooled solution resulting from step (4) thereof with about an equal volume of alcohol to thereby shower down additional crystals of ammonium hydrogen monoamidophosphate and separating same as additional product.

3. The process of claim 2 wherein the top phase comprising acetone, ammonium chloride, and phosphates, after separation of the bottom phase therefrom is sent to evaporative recovery means wherefrom the acetone is recovered for recycle to step (2) of the process and a useful byproduct comprising ammonium diamidophosphate, diammonium orthophosphate, and ammonium chloride is obtained.

4. The process of claim 2 wherein the mole ratio of ammonia:phosphoryl chloride is in the range from about 6 to 10, wherein the mole ratio of water:phosphoryl chloride is in the range from about 20 to 75, and wherein the reaction temperature of the phosphoryl chloride and aqueous ammonia is maintained in the range from about 0° C. to about 15° C.

5. The process of claim 4 wherein the mole ratio of ammonia:phosphoryl chloride is about 7, wherein the mole ratio of water:phosphoryl chloride is in the range from about 65 to 70, and wherein the reaction temperature is about 0° C.

6. The process of claim 2 wherein the residence time for reaction of the phosphoryl chloride and aqueous ammonia after mixing same and prior to addition of acetone to same is in the range from about 10 to about 60 minutes.

7. The process of claim 6 wherein the residence time for reaction of the phosphoryl chloride and aqueous ammonia after mixing same and prior to addition of acetone to same is in the range from about 20 to about 30 minutes.

8. The process of claim 7 wherein the residence time for reaction of phosphoryl chloride and aqueous ammonia after mixing same and prior to addition of acetone to same is about 25 minutes.

9. The process of claim 2 wherein the volume of acetone admixed with the volume of reaction solution of phosphoryl chloride and aqueous ammonia is in the range from about 2 to 5.

10. The process of claim 9 wherein the ratio is about 3 to 4.

11. The process of claim 10 wherein the volume of acetone admixed with the volume of reaction solution of phosphoryl chloride and aqueous ammonia is about 3.5.

References Cited

UNITED STATES PATENTS 2,661,265  12/1953  High _____ 23—106X

FOREIGN PATENTS 770,789  3/1957  Great Britain _____ 23—357

OSCAR R. VERTIZ, Primary Examiner

C. B. RODMAN, Assistant Examiner

U.S. Cl. X.R.

23—106